United States Patent
Jensen

(10) Patent No.: US 9,616,719 B1
(45) Date of Patent: Apr. 11, 2017

(54) VALVE CAP AND CORE TOOL

(71) Applicant: Cory R. Jensen, Lucan, MN (US)

(72) Inventor: Cory R. Jensen, Lucan, MN (US)

(*) Notice: Subject to any disclaimer, the term of this patent is extended or adjusted under 35 U.S.C. 154(b) by 0 days.

(21) Appl. No.: 14/802,925

(22) Filed: Jul. 17, 2015

Related U.S. Application Data

(60) Provisional application No. 62/026,013, filed on Jul. 17, 2014.

(51) Int. Cl.
*F16K 43/00* (2006.01)
*B60C 25/18* (2006.01)
*B60C 29/06* (2006.01)
*B60C 29/00* (2006.01)

(52) U.S. Cl.
CPC ............ *B60C 25/18* (2013.01); *B60C 29/002* (2013.04); *B60C 29/066* (2013.01); *Y10T 137/6109* (2015.04)

(58) Field of Classification Search
CPC ..... B06C 25/18; B60C 29/002; B60C 29/066; Y10T 137/6109
See application file for complete search history.

(56) References Cited

U.S. PATENT DOCUMENTS

| | | |
|---|---|---|
| 1,338,576 A | 4/1920 | Keys |
| 2,123,524 A | 7/1938 | Colley |
| 2,417,360 A | 3/1947 | Heintzelman |
| 2,679,654 A | 6/1954 | Hosking |
| 2,699,810 A | 1/1955 | Ferguson |
| 3,025,734 A * | 3/1962 | Ash ......................... B60C 25/18 29/450 |
| 3,100,335 A | 8/1963 | Lea |
| 3,561,090 A | 2/1971 | Fritch |
| 3,579,677 A | 5/1971 | Ullman |
| 3,718,057 A | 2/1973 | Berchtold |
| 3,840,967 A | 10/1974 | Olson |
| 3,852,839 A | 12/1974 | Blessing |
| 3,861,249 A | 1/1975 | Lindquist |
| 3,928,902 A | 12/1975 | Seims et al. |
| 4,528,735 A | 7/1985 | Eastridge et al. |
| 4,807,343 A | 2/1989 | Wadsworth |
| 5,097,580 A | 3/1992 | Story |
| 6,152,165 A | 11/2000 | Fukuda |
| 6,612,005 B2 | 9/2003 | Rivers |
| 6,725,505 B2 * | 4/2004 | Willat ..................... A47J 45/00 16/111.1 |
| 6,862,787 B2 | 3/2005 | Groves |
| 6,944,924 B2 | 9/2005 | Hayes |

(Continued)

*Primary Examiner* — Craig Schneider
*Assistant Examiner* — Kevin Barss
(74) *Attorney, Agent, or Firm* — Albert W. Watkins

(57) ABSTRACT

A valve cap and core tool has an elongate shaft terminated by a valve core head at one end and a valve cap head at a second end. The valve cap head has an elastomeric sleeve that is sufficiently elastic to slightly stretch about and securely engage a valve cap. The valve core head has an elastomeric sleeve, and coaxial with and interior of the sleeve is a rigid tube that terminates distal to the shaft at a bifurcated end. The rigid tube bifurcated end is designed to drop around and engage with a valve core, and with continued rotation unthread the valve core. Within the core of the rigid tube, and preferably securely engaged therewith, is an elastomeric tube. The elastomeric tube is of appropriate diameter and sufficiently elastic to securely grab and retain the valve core.

15 Claims, 2 Drawing Sheets

(56) References Cited

U.S. PATENT DOCUMENTS

| | | |
|---|---|---|
| 8,214,986 B2 | 7/2012 | Kicksee |
| 2004/0060157 A1 | 4/2004 | Benefield |
| 2008/0127472 A1* | 6/2008 | Whitehead .............. B25B 13/48 |
| | | 29/221.5 |

* cited by examiner

VALVE CAP AND CORE TOOL

CROSS REFERENCE TO RELATED APPLICATIONS

The present application claims the benefit of U.S. provisional patent application 62/026,013 filed Jul. 17, 2014 of like title and inventorship, the teachings and entire contents which are incorporated herein by reference.

BACKGROUND OF THE INVENTION

1. Field of the Invention

The present invention pertains generally to a tool for facilitating removal of conventional valve caps and valve assemblies or cores from pneumatic tire valve stems.

2. Description of the Related Art

A common type of valve to which the present invention pertains is known as the Schrader valve, and consists of a valve stem into which a valve core is threaded. The core includes a poppet valve that is biased closed by a small spring. While the present invention will be described with reference to the Schrader valve, it will be implicitly understood that there are other types of similar valves having valve stems and valve cores to which the present invention will also pertain.

The Schrader valve is primarily used on vehicle tires, including automobiles, trucks, motorcycles, and bicycles. However, it is also found on a variety of other apparatus such as in refrigeration and air conditioning systems, on various pneumatic shock absorbers, on aircraft, and in many other diverse apparatus.

These valves tend to protrude, and would be easily damaged if not at least minimally protected in may applications. Unfortunately, as a result of the surroundings that are used to protect the valve, the valve is also sometimes relatively difficult to access. One particularly vexing situation is in the case of trucks and semi-trailers where dual wheels are side by side with each other. The outer tire valve stem is generally easy to access, but the inside tire valve stem can be extremely difficult to get access to. As a result, both removing the protective cap and, when needed, removing the valve core including the stem can be difficult or nearly impossible without the aid of a tool.

This problem is not new, and other artisans have attempted to address this problem. Exemplary US patents and published applications, the teachings and contents which are incorporated herein by reference, include: U.S. Pat. No. 6,152,165 by Fukuda, entitled "Valve core mounting and dismounting tool"; U.S. Pat. No. 3,840,967 by Olson, entitled "Method and apparatus for maintaining and servicing a pressurized refrigeration system or the like"; U.S. Pat. No. 3,100,335 by Lea, entitled "Tire valve removing tool"; U.S. Pat. No. 6,612,005 by Rivers, entitled "Tire valve remover"; U.S. Pat. No. 1,338,576 by Keys, entitled "Tire-tool"; U.S. Pat. No. 3,852,839 by Blessing, entitled "Tire tool"; U.S. Pat. No. 6,944,924 by Hayes, entitled "Valve stem puller and valve stem core tool"; 2004/0060157 by Benefield, entitled "Valve stem cap removal tool"; U.S. Pat. No. 3,928,902 by Seims et al, entitled "Tool for tubeless tire valves"; U.S. Pat. No. 4,528,735 by Eastridge et al, entitled "Tire tool"; U.S. Pat. No. 6,862,787 by Groves, entitled "Device for installing and removing valve stem cores from tire assemblies"; U.S. Pat. No. 8,214,986 by Kicksee, entitled "Valve stem puller"; U.S. Pat. No. 2,417,360 by Heintzelman, entitled "Valve core remover"; U.S. Pat. No. 2,679,654 by Hosking, entitled "Tire inflating and servicing device"; U.S. Pat. No. 3,579,677 by Ullman, entitled "Flexible rotary compound tool"; U.S. Pat. No. 3,718,057 by Berchtold, entitled "High pressure bleed valve tool"; U.S. Pat. No. 3,861,249 by Lindquist, entitled "Valve core tool with safety bleed"; U.S. Pat. No. 2,123,524 by Colley, entitled "Tire valve tool"; U.S. Pat. No. 2,699,810 by Ferguson, entitled "Tool"; U.S. Pat. No. 3,561,090 by Fritch, entitled "Valve core changing tool"; U.S. Pat. No. 4,807,343 by Wadsworth, entitled "Tubeless tire valve stem inserter"; and U.S. Pat. No. 5,097,580 by Story, entitled "Apparatus for installing and removing valve stems".

In addition to access, another issue confounding persons servicing tires is that the valve cap and valve core are quite small, and are easily dropped, misplaced or lost. A dropped valve core can become contaminated and later malfunction, and a lost valve core can prevent the tire from being restored to useable condition, until a replacement valve core is located.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is a valve cap and core tool. The tool has an elongate shaft; a valve core head that terminates a first end of the shaft and has a valve core retainer; and a valve cap head that terminates a second end of said shaft distal to said first end of said shaft and has a valve cap retainer.

In a second manifestation, the invention is a valve core head adapted to operatively engage and retain a valve core. The valve core head has an outer sleeve; a rigid tube coaxial with and interior of the outer sleeve; a bifurcated end terminating the rigid tube adapted to operatively engage the valve core; and an elastomeric tube coaxial with and interior of the rigid tube and adapted to operatively retain the valve core.

In a third manifestation, the invention is a method of removing a valve cap and valve core from a valve stem. In accord with the method, a valve cap and core tool is moved in a direction parallel to a longitudinal axis of a shaft of the valve cap and core tool onto the valve cap to thereby engage and retain the valve cap with the valve cap and core tool. The shaft is spun to remove the valve cap from the valve stem. The valve cap and core tool and the retained valve cap are withdrawn from the valve stem. The valve cap and core tool is then rotated about an axis transverse to the longitudinal shaft axis through approximately 180 degrees, and a valve core head is aligned with the valve stem. The valve cap and core tool is pressed towards the valve stem. The shaft is rotated about the shaft longitudinal axis while maintaining a pressing force parallel to the longitudinal axis of the shaft, so as to both rotate and drive the valve core head onto the valve stem. The valve cap and core tool is removed together with the valve core from the valve stem.

OBJECTS OF THE INVENTION

Exemplary embodiments of the present invention solve inadequacies of the prior art by providing a valve cap and core tool having an elongate shaft. A valve core head defines one end of the shaft, and a valve cap head defines a second end. An optional vent hole may be provided in either or each of the valve core head and valve cap head.

The valve cap head is preferably designed to be pressed about a valve cap, and an elastomeric sleeve that is part of the valve cap head is preferably sufficiently elastic to slightly stretch about and thereby securely engage the cap. The elastomeric sleeve will also flex and absorb any axial misalignment between the shaft and the valve stem.

The valve core head exterior is defined by an elastomeric sleeve. The elastomeric sleeve expands around the threads on the valve stem. This self-aligns the valve cap and core tool with a valve stem. Coaxial with and interior of the sleeve is a rigid tube that terminates distal to the shaft at a bifurcated end. The rigid tube bifurcated end is designed to drop around and engage with the valve core, and with continued rotation unthread the valve core to remove the valve core from the valve stem. Within the core of the rigid tube, and preferably securely engaged therewith, is an elastomeric tube. The elastomeric tube is of appropriate diameter and sufficiently elastic to securely grab and retain the valve core, even when the valve core has been removed from the valve stem. This ensures safe handling of the valve core even while the valve cap and core tool is removed from the vicinity of the valve stem. As with the valve cap, the valve stem may be left within the valve core head, or may alternatively be removed therefrom and safely stored. Presuming a good fit between elastomeric sleeve and valve cap, as well as a good fit between elastomeric tube and valve core, both the valve cap and the valve core may be left within and will be securely retained by the valve cap and core tool, thereby preventing the loss of small parts that might otherwise be hard to find, and which, if dropped onto the ground, might be contaminated undesirably by dirt, debris, oil or other contaminants.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is the provision of a tool that facilitates the intuitive installation and removal of both pneumatic valve caps and valve cores. A second object of the invention is to facilitate alignment between a longitudinal axis of the tool and a valve stem. Another object of the present invention is the provision of features that easily affix to and retain valve caps and cores, to avoid damaging or losing these small parts. A further object of the invention is the provision of such a tool using a minimum of components and relatively low-cost manufacturing techniques. Yet another object of the present invention is the provision of such a tool which is readily stowed within a small space until needed, and which is still durable and reliable.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
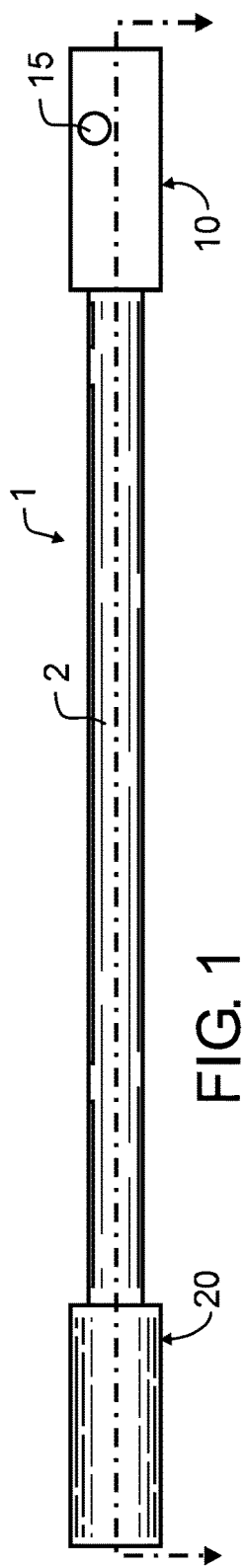
FIG. 1 illustrates a preferred embodiment valve cap and core tool designed in accord with the teachings of the present invention from a side elevational view.
Figure 2:
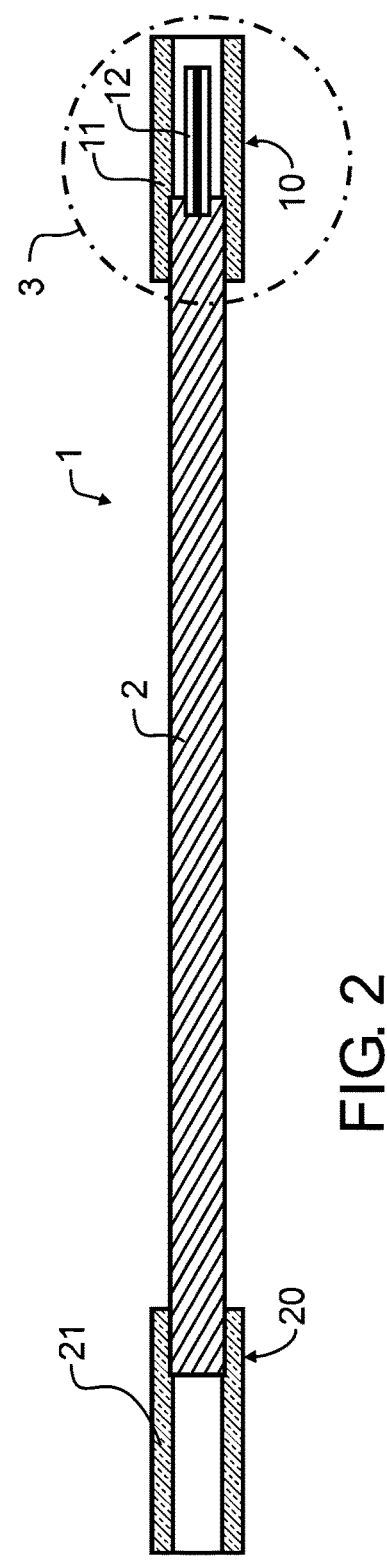
FIG. 2 illustrates the preferred embodiment valve cap and core tool of FIG. 1 from a sectional view taken along the section line of FIG. 1.

In a preferred embodiment of the invention illustrated in FIG. 1, valve cap and core tool 1 has an elongate shaft 2 that terminates at a first end with a valve core head 10, and at a second end distal thereto with a valve cap head 20. An optional vent hole 15 is illustrated that passes through elastomeric sleeve 11 into the interior of valve core head 10. A similar vent hole may also optionally be provided within valve cap head 20, and in such case would pass through elastomeric sleeve 21.

Valve cap head 20 is preferably designed to be pressed about a valve cap, such as the Schrader valve caps commonly sold in the marketplace. Elastomeric sleeve 21 is preferably sufficiently elastic to slightly stretch about a cap, and thereby securely engage and retain the valve cap. This permits the cap to be removed and replaced easily, since elastomeric sleeve 21 will securely retain the cap during either installation or removal.

Elastomeric sleeve 21 provides another important function. One of the objectives of preferred embodiment valve cap and core tool 1 is to be able to reach into small or hard to access places. Shaft 2, which may in the preferred embodiment be any suitable length chosen by a designer, will provide some reach or extension, so that a person might operatively grasp shaft 2 near to valve core head 10, and extend valve cap head 20 some distance therefrom. However, as may be appreciated, it will be difficult for a person to exactly align shaft 2 with the valve stem, and, as a result, there may be a need for something to absorb the axial misalignment that will likely occasionally arise there between. By using an at least slightly elastomeric material for elastomeric sleeve 21, then elastomeric sleeve 21 will flex and absorb any axial misalignment between shaft 2 and the valve stem.

In the preferred embodiment valve cap and core tool 1, elastomeric sleeve 21 may simply be a rubber or synthetic rubber tube that fits snugly about and may be permanently affixed to shaft 2.

This provides both simple and low-cost manufacture, and also achieves the other objectives described herein above. However, other materials and geometries may be used in alternative embodiments. For exemplary and non-limiting purposes, a more rigid tube may be provided, and lined on an interior thereof with an elastomeric material. In such case, rather than elastomeric sleeve 21 stretching about a valve cap, the elastomeric material interior of the rigid tube will instead be compressed between the valve cap and the rigid tube. The net effect is still a compressive force about the valve cap, which facilitates the selective securing of the valve cap within valve cap head 20. Consequently, any suitable apparatus that achieves this compressive force, including but not limited to those taught in the patents incorporated by reference herein above, will be considered to be incorporated herein for the purposes of the present disclosure.

Distal to valve cap head 20 is valve core head 10, which is on an exterior defined by elastomeric sleeve 11. While an elastomeric material such as rubber of composition similar to that of elastomeric sleeve 21 is preferred for the fabrication of elastomeric sleeve 11, owing to the simplicity of preparing two like pieces of material of similar size and composition, there is no requirement that the materials be the same for sleeves 11 and 21. Instead, elastomeric sleeve 11 may be of much more diverse composition, because the valve stem is not retained by this sleeve 11, and instead elastomeric sleeve 11 is primarily serving the function of assisting with proper alignment.

Figure 3:
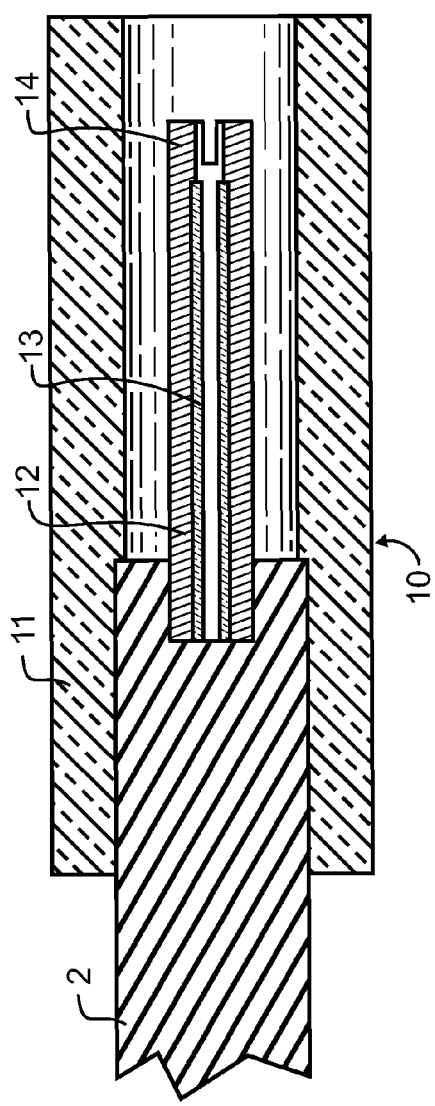
FIG. 3 illustrates the preferred embodiment valve core head used in the preferred embodiment valve cap and core tool of FIG. 2 from an enlarged sectional view taken within line 3' of FIG. 2.
Figure 4:
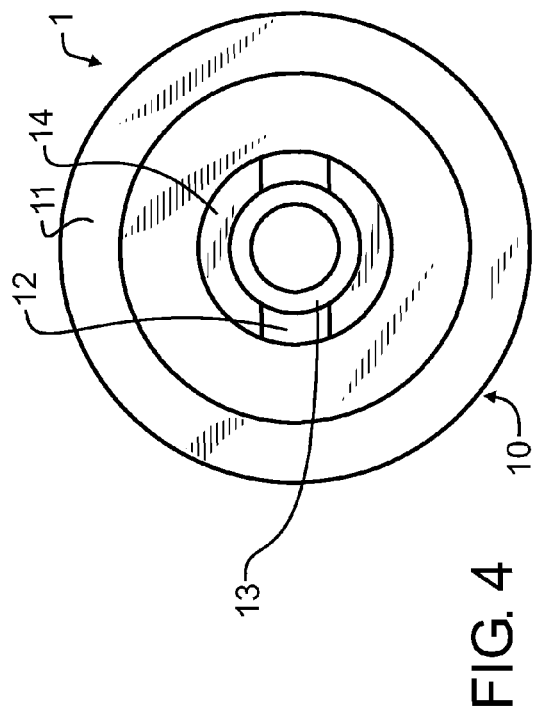
FIG. 4 illustrates the preferred embodiment valve cap and core tool of FIG. 1 from a front elevational view looking into the preferred embodiment valve core head.

As best illustrated in FIGS. 3 and 4, interior to elastomeric sleeve 11, but preferably coaxial therewith, is a rigid tube 12 that terminates distal to shaft 2 at bifurcated end 14. Rigid tube 11 is operative through bifurcated end 14 to engage with the features found on Schrader-style valve core, to allow the valve core to be rotated relative to the valve stem and thereby be removed therefrom. As will be apparent to those reasonably skilled in the art, bifurcated end 14 may be replaced by other geometries and constructions that are suited for operation with valves of geometry different from the Schrader valves.

Within the core of rigid tube 12, and preferably securely engaged therewith, is an elastomeric tube 13. Elastomeric tube 13 is adapted to be operative as a valve core retainer, by providing sufficient adhesion, friction, or some combination of compression and adhesion or friction to reliably hold a valve core therein. The use of an elastomeric tube is preferred, since this geometry is readily available for relatively low cost, readily compatible with the tubular nature of rigid tube 12, and readily affixed or integrated therewith. Nevertheless, the particular geometry and composition of elastomeric tube 13 is not critical to the operation of the present invention, so long as reliable valve stem retention occurs. Consequently, alternatives known in the mechanical arts to elastomeric tube 13 that provide for releasably securing a valve core are considered to be incorporated herein as alternative embodiments.

In accord with a preferred embodiment method of use and operation, a person will first use valve cap head 20 to remove a valve cap, by pressing preferred embodiment valve cap and core tool 1 in a direction parallel to the longitudinal axis of shaft 2 onto the valve cap. Next, the person will easily manually spin shaft 2 to remove the cap from the stem. Then the person will withdraw preferred embodiment valve cap and core tool 1, and can preferably leave the valve cap in place in valve cap head 20, owing to the valve cap retainer function of elastomeric sleeve 21. Nevertheless, if they so choose, a person may also remove the valve cap and place it somewhere safe.

Next, they will rotate preferred embodiment valve cap and core tool 1 end-to-end 180 degrees, so that valve core head 10 is now aligned with the valve stem. Once again, they will press preferred embodiment valve cap and core tool 1 towards the valve stem, this time with elastomeric sleeve 11 expanding around the threads on the valve stem. This self-aligns preferred embodiment valve cap and core tool 1 with the valve stem. Prior to or at least once preferred embodiment valve cap and core tool 1 can not be pressed any farther, the person will begin rotating shaft 2 while gently maintaining the force along the longitudinal axis of shaft 2, so as to both rotate and drive valve core head 10 onto the valve stem. As this is done, bifurcated end 14 will drop around and engage with the valve core, and with continued rotation the valve core will be unthreaded and removed from the stem.

A very important part of the present invention is elastomeric tube 13 provided within rigid tube 12, which is operative as a valve core retainer. Most preferably, elastomeric tube 13 is of appropriate diameter and sufficiently elastic to securely grab and retain the valve core, even when the valve core has been removed from the valve stem. This ensures safe handling of the valve core, while preferred embodiment valve cap and core tool 1 is removed from the vicinity of the valve stem. As with the valve cap, the valve core may be left within valve core head 10, or may alternatively be removed therefrom and safely stored. In the preferred embodiment, and presuming a good fit between elastomeric sleeve 21 and the valve cap, as well as a good fit between elastomeric tube 13 and the valve core, both may be left within and will be securely retained by preferred embodiment valve cap and core tool 1, thereby preventing the loss of small parts that might otherwise be hard to find, and which, if dropped onto the ground, might be contaminated undesirably by dirt, debris, oil or other contaminants.

In the preferred embodiment valve cap and core tool 1 as illustrated, elastomeric sleeves 11 and 21 are simply slid about shaft 2. However, it is also contemplated that these sleeves may be slightly tapered, so that they start from the diameter of shaft 2 and gain or lose diameter as the distance from shaft 2 increases. In another alternative embodiment, shaft 2 may have ends that are slightly reduced in diameter, and elastomeric sleeves 11, 21 may be affixed about those ends. As may be apparent, the relationship between these components is not critical to the operation of the present invention, so long as these elastomeric sleeves 11, 21 are, in fact, affixed to shaft 2.

In one alternative embodiment of the invention, elastomeric sleeves 11, 21 and elastomeric tube 13 may be formed with longitudinally extensive ribs and/or grooves, that may be used in combination with a particular material to increase the gripping power of the elastomeric sleeves 11, 21 or tube 13. Similarly, other materials may be used as a coating or layer inside of the elastomeric sleeves 11, 21 or tube 13, also to increase the coefficient of friction or otherwise to better hold the valve core or valve cap.

From the foregoing figures and description, several additional features and options become more apparent. First of all, preferred embodiment valve cap and core tool 1 may be manufactured from a variety of materials, including metals, resins and plastics, ceramics or cementitious materials, or even combinations, laminates or composites of the above. The specific material used may vary, though special benefits are attainable if several important factors are taken into consideration. First, elastomeric sleeves 11, 21 will preferably be at least partially resilient or elastomeric materials, to expand about the valve cap and valve stem threads as required. Furthermore, it is preferable that all materials are sufficiently tough and durable to permit the necessary pressing and twisting forces, even at low and high temperature extremes.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:
1. A valve cap and core tool, comprising:
   an elongate shaft;
   a valve core head that terminates a first end of said shaft and having
      an outer sleeve;

a rigid tube coaxial with and interior of said outer sleeve and having a bifurcated end terminating said rigid tube, said bifurcated end adapted to operatively engage with a valve core;

a valve core retainer defined by an elastomeric tube coaxial with and interior of said rigid tube and having a diameter and elasticity adapted to operatively securely grab and retain said valve core; and a valve cap head that terminates a second end of said shaft distal to said first end of said shaft and has a valve cap retainer.

2. The valve cap and core tool of claim 1, wherein said outer sleeve further comprises an elastomeric sleeve.

3. The valve cap and core tool of claim 1, wherein said valve cap retainer further comprises an elastomeric material of sufficiently elasticity capable of slightly stretching about a valve cap, and thereby adapted to operatively securely engage and retain said valve cap.

4. The valve cap and core tool of claim 3, wherein said elastomeric valve cap retainer is further adapted to operatively flex and accommodate misalignment between said shaft and a valve stem.

5. The valve cap and core tool of claim 1, wherein said elastomeric valve cap retainer further comprises an elastomeric sleeve.

6. The valve cap and core tool of claim 5, further comprising a vent hole passing through said valve cap retainer elastomeric sleeve.

7. The valve cap and core tool of claim 1, wherein said elastomeric valve cap retainer further comprises an inside diameter equal to an inside diameter of said outer sleeve, both of said elastomeric valve cap retainer and said outer sleeve each partially encompassing and engaged with said shaft.

8. A valve core head adapted to operatively engage and retain a valve core, comprising:

an outer sleeve;

a rigid tube coaxial with and interior of said outer sleeve;

a bifurcated end terminating said rigid tube adapted to operatively engage said valve core; and a valve core retainer coaxial with and interior of said rigid tube and adapted to operatively retain said valve core;

wherein said valve core retainer further comprises an elastomeric tube having a diameter and elasticity adapted to operatively securely grab and retain said valve core.

9. The valve core head of claim 8, wherein said outer sleeve further comprises an elastomer.

10. The valve cap and core tool of claim 9, further comprising a vent hole passing through said elastomeric outer sleeve.

11. A valve cap and core tool, comprising:

a rigid and elongate shaft;

a valve core head that terminates a first end of said shaft and has a valve core retainer and an elastomeric outer sleeve having an inside diameter partially encompassing and engaged with said shaft; and a valve cap head that terminates a second end of said shaft distal to said first end of said shaft and has an elastomeric valve cap retainer sleeve, said elastomeric valve cap retainer sleeve having an inside diameter equal to said inside diameter of said valve core head elastomeric outer sleeve and partially encompassing and engaged with said shaft.

12. The valve cap and core tool of claim 11, wherein said valve core head further comprises a rigid tube coaxial with and interior of said outer sleeve and terminated by a bifurcated end, said bifurcated end adapted to operatively engage with a valve core.

13. The valve cap and core tool of claim 11, wherein said valve core retainer comprises an elastomeric tube coaxial with and interior of said rigid tube, said elastomeric tube having a diameter and elasticity adapted to operatively securely grab and retain said valve core.

14. The valve cap and core tool of claim 11, further comprising a vent hole passing through said elastomeric valve cap retainer sleeve.

15. The valve cap and core tool of claim 11, further comprising a vent hole passing through said valve core head elastomeric outer sleeve.

* * * * *